J. P. WEIS.
GOODS SPREADER.
APPLICATION FILED APR. 29, 1914.
1,139,612.
Patented May 18, 1915.
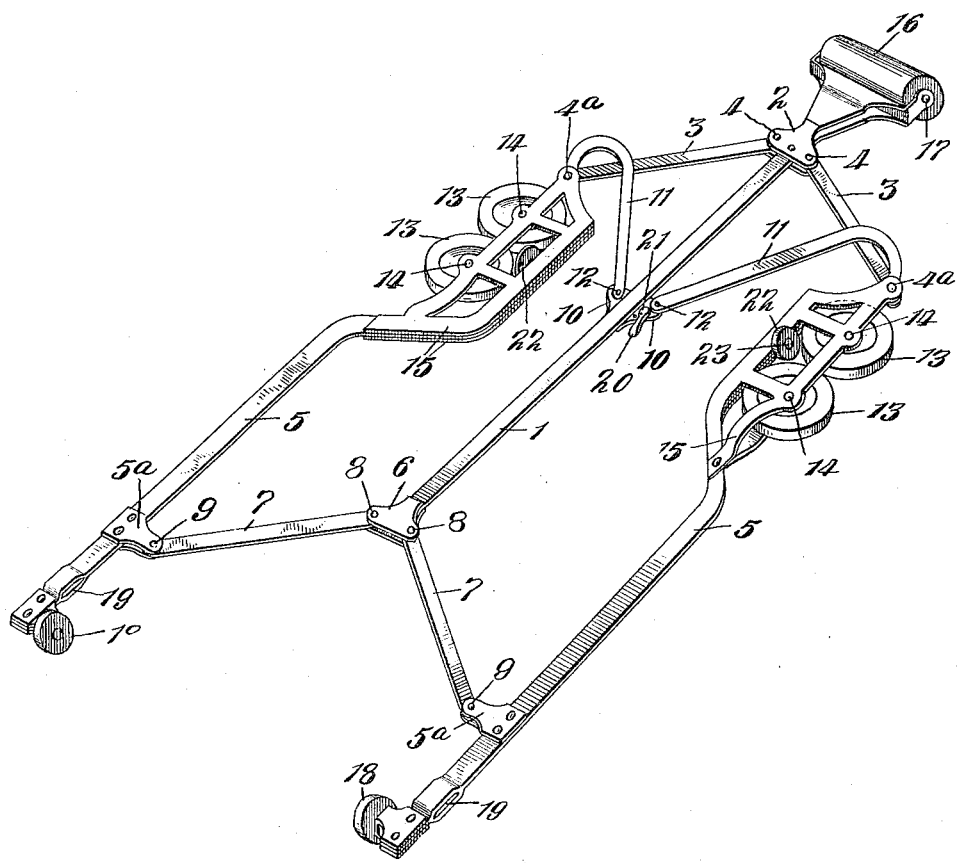
WITNESSES
INVENTOR
ATTORNEY
THE NORRIS PETERS CO., PHOTO-LITHO., WASHINGTON, D. C.

UNITED STATES PATENT OFFICE.

JOHN PETER WEIS, OF NYACK, NEW YORK, ASSIGNOR TO LUCIUS N. LITTAUER, OF GLOVERSVILLE, NEW YORK.

GOODS-SPREADER.

1,139,612.

Specification of Letters Patent.

Patented May 18, 1915.

Application filed April 29, 1914. Serial No. 835,207.

*To all whom it may concern:*

Be it known that I, JOHN PETER WEIS, a citizen of the United States, residing at Nyack, in the county of Rockland and State of New York, have invented certain new and useful Improvements in Goods-Spreaders, of which the following is a specification.

This invention is a goods-spreader for use in spreading tubular knit and other goods not only for introducing the goods to machines operating on the goods, but also for spreading the goods in dyeing, drying and other operations.

The accompanying drawing forming a part hereof shows a perspective view of the spreader distended, and in the drawing 1 is its central lengthwise rib the rear end of which is enlarged at 2. To opposite portions of this enlargement the opposite forwardly extending bars 3 are respectively pivoted at 4. The outward end of each bar 3 is pivotally connected at 4ª with a side bar 5.

The central rib 1, at its front end is enlarged at 6, and to opposite portions of this enlargement the opposite forwardly and laterally extending bars 7 are respectively pivoted at 8, the outward end of each bar 7 being pivoted at 9 to an ear 5ª of a side bar.

Between its ends the central rib has opposite slidable ears 10, and to each of these a laterally and rearwardly extending bar 11 is pivoted at 12, the outward end of each bar being pivotally connected with the pivot pins 4ª. Ears 10 project laterally from a plate at one side of the central rib 1. There is thus a central lengthwise-extending rib at each side of which is a side bar, the two side bars being pivotally connected to the central rib by three lateral bars between each side bar and the rib. This structure may be laterally distended by pulling the side bars away from the central rib, and made narrower by pushing the side bars toward the central rib, whereby the spreader is adjusted to different widths for use in tubular flexible goods or products for spreading or distension of varying sizes of tubular goods or products.

The side bars are each provided with antifriction means, shown as two disks 13 each journaled at 14 to a member 15 of a side bar, the peripheries of the disks being exposed in line with the outward lateral edge of the side bar that carries them, and the journals 14 being at right-angles to the upper and under sides of the side bars. These anti-friction disks greatly facilitate the insertion of the spreader in loosely knit tubular goods and are advantageous in all cases. The rear end of the central rib carries a roller 16 the journal 17 of which is at right-angles to the journals 14, and the front end of each side bar is provided with a journaled disk 18, its journal being also at right-angles to the journals 14. These anti-friction devices 16 and 18 coöperate with the side disks 13 in putting the spreader into and pulling it out of tubular flexible goods.

All the anti-friction devices also serve, when the spreader is expanded in tubular knit or other goods to be fed to a sewing or cutting machine, the spreader being then held stationary and the spread goods being pulled over the spreader by a feeding mechanism, to facilitate the feed of the goods in smoothly distended condition. This spreader is shown in connection with a cutting-and-sewing machine in my application Serial No. 770,684, filed May 29, 1913.

Each side bar is provided with an elongated slot 19 which receives a goods-cutter carried by the machine when the spreader is used therein. The ends of this spreader are referred to as "front" and "rear" not with any particular reference to the use of the spreader otherwise than when in a machine. In the latter use, as shown in my said application, the end of the spreader provided with the disks 18 may be called the front end. In such use the disks serve as abutments opposed to feed rolls which pull the goods over the spreader, the disks 13 in such use being opposed to guides on the machine. But my new spreader is adapted for use otherwise than as a machine part.

To hold the spreader in an adjusted position an ear 10 is provided with a manually operable cam 20 pivoted to the ear at 21, a surface of the cam being movable into and out of holding contact with the adjacent end of a bar 11. The side bars are also provided with anti-friction disks 22 each journaled as at 23 so that the peripheries of the disks project at the upper and under sides of the spreader, similarly to disks 18.

The anti-friction rolls 16, 18 and 22 are of a diameter which effects their projection beyond each broad flat side of the spreader. Hence, when tubular goods are on the frame, the tube is distended flatwise with the flat tube sides spaced apart by the friction-rolls 16, 18 and 22 which thus perform the double functions of anti-friction devices and separators of the broad, flat sides of the distended tubular goods. The spreader then is highly useful not only as a machine adjunct but as a work-frame for various manual operations. Whether used as a machine adjunct or as a manual work-frame the separated tube sides may be smoothly cut or slit in any desired way, according to any desired pattern. Both sides may be cut simultaneously or the cutting operation may be performed on one or the other or both, while the tube is taut. The walls of the slots 19 serve as guides for a cutter, either mechanically or manually actuated, in slitting neatly either edge of the expanded tubular goods as may be desired. These slots are shown located with special reference to use in the manufacture of under-clothing.

What I claim is:

1. A spreader for flexible tubular goods comprising a central lengthwise-extending rib; a member slidable on the rib; a pair of side bars; and connections between the slidable member and each side bar, such connections being pivoted to said member and to the side bars; and other pivoted connections between the rib and side bars; all constructed and operating to permit lateral distension and contraction of the spreader while maintaining the side bars parallel; said member sliding on the rib when such adjustments are made.

2. A spreader for flexible tubular goods comprising a central lengthwise-extending rib; a member slidable on the rib; a pair of side bars; and connections between the slidable member and each side bar, such connections being pivoted to said member and to the side bars; and other pivoted connections between the rib and side bars; all constructed and operating to permit lateral distension and contraction of the spreader while maintaining the side bars parallel; said member sliding on the rib when such adjustments are made; the side bars each having an inward, roller-containing offset, and rollers mounted in the offset.

3. In a goods-spreader, a set side-bar having a lengthwise-extending cutter-receiving groove opening along the outer edge of the bar.

4. A spreader for flexible tubular goods comprising a central lengthwise-extending rib; a member slidable on the rib; a pair of side bars; and connections between the slidable member and each side bar, such connections being pivoted to said member and to the side bars; and other pivoted connections between the rib and side bars; all constructed and operating to permit lateral distension and contraction of the spreader while maintaining the side bars parallel; said member sliding on the rib when such adjustments are made; the rib having at one end a roller-supporting extension and a roller journaled therein.

In testimony whereof I have hereunto set my hand in the presence of two subscribing witnesses, this 8th day of April, 1914.

JOHN PETER WEIS.

Witnesses:
WILLIAM A. SCOTT,
JOHN W. KANE.